(12) United States Patent
Malegam

(10) Patent No.: US 11,906,952 B2
(45) Date of Patent: Feb. 20, 2024

(54) SYSTEM AND METHOD FOR OPERATING A MINING MACHINE WITH RESPECT TO A GEOFENCE USING A DYNAMIC OPERATION ZONE

(71) Applicant: Joy Global Surface Mining Inc, Milwaukee, WI (US)

(72) Inventor: Keshad Darayas Malegam, Milwaukee, WI (US)

(73) Assignee: JOY GLOBAL SURFACE MINING INC, Milwaukee, WI (US)

( * ) Notice: Subject to any disclaimer, the term of this patent is extended or adjusted under 35 U.S.C. 154(b) by 303 days.

(21) Appl. No.: 17/179,765

(22) Filed: Feb. 19, 2021

(65) Prior Publication Data

US 2022/0269253 A1 Aug. 25, 2022

(51) Int. Cl.
| | |
|---|---|
| G05B 19/00 | (2006.01) |
| G05B 19/418 | (2006.01) |
| G05D 1/00 | (2006.01) |
| H04W 4/021 | (2018.01) |

(52) U.S. Cl.
CPC ... *G05B 19/41895* (2013.01); *G05B 19/4183* (2013.01); *G05D 1/0214* (2013.01); *G05D 1/0223* (2013.01); *H04W 4/021* (2013.01); *G05D 2201/0216* (2013.01)

(58) Field of Classification Search
CPC .......... G05B 19/41895; G05B 19/4183; G05D 1/0214; G05D 1/0223; G05D 2201/0216; G05D 2201/021; H04W 4/021
See application file for complete search history.

(56) References Cited

U.S. PATENT DOCUMENTS

| | | |
|---|---|---|
| 7,239,965 B2 | 7/2007 | Wehrlen et al. |
| 7,689,354 B2 | 3/2010 | Heiniger et al. |
| 7,734,397 B2 | 6/2010 | Peterson et al. |
| 8,131,432 B2 | 3/2012 | Senneff et al. |
| 9,415,976 B2 | 8/2016 | Hermann et al. |
| 10,410,516 B1 | 9/2019 | Andersson et al. |
| 10,586,463 B2 | 3/2020 | Xu et al. |
| 10,662,613 B2 | 5/2020 | Ready-Campbell et al. |

(Continued)

FOREIGN PATENT DOCUMENTS

| | | | |
|---|---|---|---|
| EP | 3761141 A2 * | 1/2021 | ........... A01D 34/008 |
| EP | 3761141 A2 | 1/2021 | |

(Continued)

OTHER PUBLICATIONS

Dziuk, "How to Set up Geofencing with Rastrac", Rastrac, <https://info.rastrac.com/blog/how-to-setup-geofencing-rastrac>, Feb. 2020, 5 pages.

(Continued)

*Primary Examiner* — Peter D Nolan
*Assistant Examiner* — Peter Y Ning
(74) *Attorney, Agent, or Firm* — Husch Blackwell LLP

(57) ABSTRACT

Systems and methods for operating a mining machine with respect to a geofence. One system includes an electronic processor configured to determine a first virtual operation zone positioned around the mobile industrial machine, where the first virtual operation zone is a dynamic area around the mobile industrial machine. The electronic processor is also configured to modify a parameter of the first virtual operation zone.

20 Claims, 9 Drawing Sheets

(56) References Cited

U.S. PATENT DOCUMENTS

| | | | |
|---|---|---|---|
| 11,630,447 B1* | 4/2023 | Bhaskaran | B65G 1/0492 700/245 |
| 2003/0060938 A1* | 3/2003 | Duvall | B60R 25/1012 701/2 |
| 2006/0265128 A1 | 11/2006 | Miller | |
| 2007/0293996 A1 | 12/2007 | Mori et al. | |
| 2009/0140886 A1 | 7/2009 | Bender | |
| 2016/0379490 A1 | 12/2016 | Simanowski et al. | |
| 2017/0031358 A1 | 2/2017 | McHugh et al. | |
| 2017/0191243 A1* | 7/2017 | Sharp | E02F 9/261 |
| 2018/0266247 A1 | 9/2018 | Lundh et al. | |
| 2018/0292832 A1* | 10/2018 | Bae | G05D 1/0214 |
| 2018/0298746 A1 | 10/2018 | Short et al. | |
| 2019/0139421 A1 | 5/2019 | Nilsson et al. | |
| 2019/0161274 A1* | 5/2019 | Paschall, II | G05D 1/0246 |
| 2019/0188620 A1* | 6/2019 | Marsolek | G01S 19/51 |
| 2019/0262993 A1 | 8/2019 | Cole et al. | |
| 2019/0346848 A1* | 11/2019 | Zhou | G01S 19/35 |
| 2020/0160682 A1 | 5/2020 | Johnson et al. | |
| 2020/0219401 A1 | 7/2020 | Ren et al. | |
| 2020/0332479 A1 | 10/2020 | O'Donnell | |
| 2020/0346578 A1 | 11/2020 | Kean et al. | |
| 2020/0372804 A1* | 11/2020 | Aljuaid | G06V 20/176 |
| 2020/0399105 A1 | 12/2020 | Draayer et al. | |
| 2021/0099828 A1* | 4/2021 | Hanna | H04W 4/021 |
| 2022/0046381 A1* | 2/2022 | Ong | G08G 1/164 |
| 2022/0187823 A1* | 6/2022 | Ramasamy | G08B 13/19647 |

FOREIGN PATENT DOCUMENTS

| | | | |
|---|---|---|---|
| WO | 2020163920 A1 | 8/2020 | |
| WO | WO-2020206426 A1 * | 10/2020 | E02F 9/0841 |

OTHER PUBLICATIONS

Golf Business International, "A closer look at the E-Z-GO TFM System, and why GPS is the future of golf carts", <https://golfbusinessinternational.com/2018/08/02/e-z-go-introduces-tfm-gps/>, Aug. 2018, 6 pages.

International Search Report and Written Opinion for Application No. PCT/US2022/017066 dated May 2, 2022 (21 pages).

* cited by examiner

SYSTEM AND METHOD FOR OPERATING A MINING MACHINE WITH RESPECT TO A GEOFENCE USING A DYNAMIC OPERATION ZONE

FIELD

Embodiments described herein relate to operating a mining machine with respect to a geofence.

SUMMARY

A geofence is a virtual perimeter for a real-world geographic area that is generated using a predefined set of boundaries using global navigation satellite system ("GNSS") technology. The geofence logic enables software to trigger a response when a mobile industrial machine (for example, a mining machine, such as a blasthole drill, a rope shovel, or the like) leaves the pre-defined geographic area, which ensures that the machine stays within a designated area. In a mine setting, a mining machine may inadvertently be driven into a high wall, over a berm, or into a restricted region.

Accordingly, embodiments described herein provide a geofence design that enables a mining machine to safely operate within a confined geofence area and prevents operation outside of the geofence area. In particular, the mining machine may freely move around the confined geofence area based on commands, for example, a propel command, a crowd command, a swing command, or another command for controlling operation of the mining machine (i.e., autonomous or automated commands or commands from an on-board or remote operator that cause the mining machine to move over the ground surface). However, as the mining machine approaches the geofence boundary, the embodiments described herein override the speed commands to gradually slow the mining machine down to a stop at the point when the mining machine reaches the geofence boundary. Alternatively or in addition, the embodiments described herein determine whether a command will cause the mining machine to propel further into the prohibited geofence area (for example, into a restricted region) or away from the geofence boundary back towards the confined geofence area (for example, towards a permitted area). When the command will cause the mining machine to propel further into the prohibited geofence area, the command is blocked or overridden. When the command will cause the mining machine to move away from the geofence boundary back into the confined geofence area, the command is executed.

One embodiment provides a system for operating a mobile industrial machine with respect to a geofence. The system includes an electronic processor configured to receive a command for controlling the mobile industrial machine. The electronic processor is also configured to determine whether a perimeter point of a first operation zone positioned around the mobile industrial machine is within a restricted region. The electronic processor is also configured to, in response to determining that the perimeter point of the first operation zone is within the restricted region, determine whether performance of the command increases penetration of the first operation zone into the restricted region, and control the mobile industrial machine to perform the command or a stop command based on whether the performance of the command increases penetration of the first operation zone into the restricted region. The electronic processor is also configured to, in response to determining that the perimeter point of the first operation zone is not within the restricted region, determine whether a perimeter point of a second operation zone positioned around the mobile industrial machine is within the restricted region, and control the mobile industrial machine to perform the command or a modified command based on whether the perimeter point of the second operation zone is within the restricted region.

Another embodiment provides a method for operating a mobile industrial machine with respect to a geofence. The method includes receiving, with an electronic processor, an command for controlling the mobile industrial machine. The method also includes determining, with the electronic processor, whether a perimeter point of a first operation zone positioned around the mobile industrial machine is within a restricted region. The method also includes, in response to determining that the perimeter point of the first operation zone is within the restricted region, determining, with the electronic processor, whether performance of the command increases penetration of the first operation zone into the restricted region, and controlling, with the electronic processor, the mobile industrial machine to perform the command or a stop command based on whether the performance of the command increases penetration of the first operation zone into the restricted region. The method also includes, in response to determining that the perimeter point of the first operation zone is not within the restricted region, determining, with the electronic processor, whether a perimeter point of a second operation zone positioned around the mobile industrial machine is within the restricted region, where the first operation zone has a smaller area than the second operation zone and the first operation zone is positioned within the second operation zone, and controlling, with the electronic processor, the mobile industrial machine to perform the command or a modified command based on whether the perimeter point of the second operation zone is within the restricted region.

Yet another embodiment provides a system for operating a mobile industrial machine with respect to a geofence. The system includes an electronic processor configured to receive a command for controlling the mobile industrial machine. The electronic processor is also configured to determine a first operation zone positioned around the mobile industrial machine, where the first operation zone is a dynamic area around the mobile industrial machine, and determine whether a perimeter point of a first operation zone positioned around the mobile industrial machine is within a restricted region. The electronic processor is also configured to, in response to determining that the perimeter point of the first operation zone is within the restricted region, determine whether performance of the command increases penetration of the first operation zone into the restricted region, and control the mobile industrial machine to perform the command or a stop command based on whether the performance of the command increases penetration of the first operation zone into the restricted region.

Yet another embodiment provides a system for operating a mobile industrial machine with respect to a geofence. The system includes an electronic processor configured to establish a first virtual operation zone positioned around the mobile industrial machine. The electronic processor is also configured to establish a second virtual operation zone positioned around the mobile industrial machine and nested within the first virtual operating zone.

Yet another embodiment provides a system for operating a mobile industrial machine with respect to a geofence. The system includes an electronic processor configured to determine a first virtual operation zone positioned around the mobile industrial machine, where the first virtual operation zone is a dynamic area around the mobile industrial machine. The electronic processor is also configured to modify a parameter of the first virtual operation zone.

Other aspects of the embodiments will become apparent by consideration of the detailed description and accompanying drawings.

DETAILED DESCRIPTION

Figure 1:
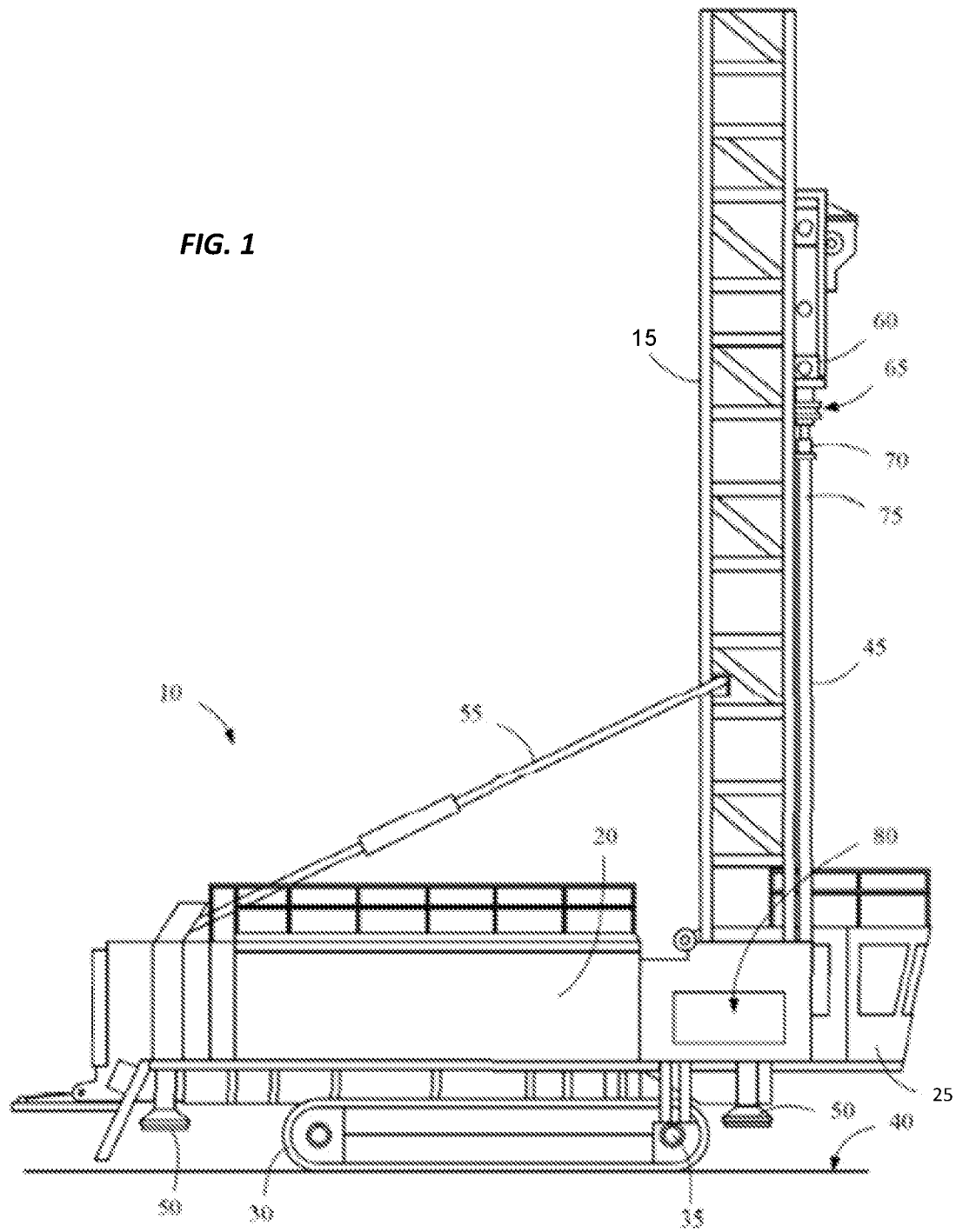
FIG. 1 illustrates a mining machine according to some embodiments.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (for example, stored on non-transitory computer-readable medium) executable by one or more electronic processors, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," and the like, described in the specification can include one or more electronic processors, one or more computer-readable medium modules, one or more input/output interfaces, and various connections (for example, a system bus) connecting the components.

Relative terminology, such as, for example, "about," "approximately," "substantially," and the like, used in connection with a quantity or condition would be understood by those of ordinary skill to be inclusive of the stated value and has the meaning dictated by the context (for example, the term includes at least the degree of error associated with the measurement accuracy, tolerances (for example, manufacturing, assembly, use, and the like) associated with the particular value, and the like). Such terminology should also be considered as disclosing the range defined by the absolute values of the two endpoints. For example, the expression "from about 2 to about 4" also discloses the range "from 2 to 4." The relative terminology may refer to plus or minus a percentage (for example, 1%, 5%, 10%, or more) of an indicated value.

Functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not explicitly listed.

FIG. 1 illustrates a blasthole drill 10 that includes a drill tower 15, a base 20 (for example, a machinery house) beneath the drill tower 15 that supports the drill tower 15, an operator cab 25 coupled to the base 20, and crawlers 30 driven by a crawler drive 35 that drives the blasthole drill 10 along a ground surface 40. The blasthole drill 10 also includes a drill pipe 45 configured to extend downward (for example, vertically) through the ground surface 40 and into a borehole. In some constructions, multiple drill pipes 45 are connected together to form an elongated drill string that extends into the borehole. The blasthole drill 10 also includes leveling jacks 50 coupled to the base 20 that support the blasthole drill 10 on the ground surface 40, and a brace 55 coupled to both the base 20 and the drill tower 15 that supports the drill tower 15 on the base 20. The drill tower 15 includes a drill head motor 60 coupled to the drill tower 15 that drives a drill head 65 and a coupling 70 that couples together the drill head 65 with an upper end 75 of the drill pipe 45. The blasthole drill 10 also includes a bit changer assembly 80 that manually or autonomously exchanges a drill bit on a lower end of the drill pipe 45. The bit changer assembly 80 also stores inactive drill bits during operation of the blasthole drill 10. Other constructions of the blasthole drill 10 do not include, for example, the operator cab 25, the brace 55, or one or more other components as described above.

Figure 2:
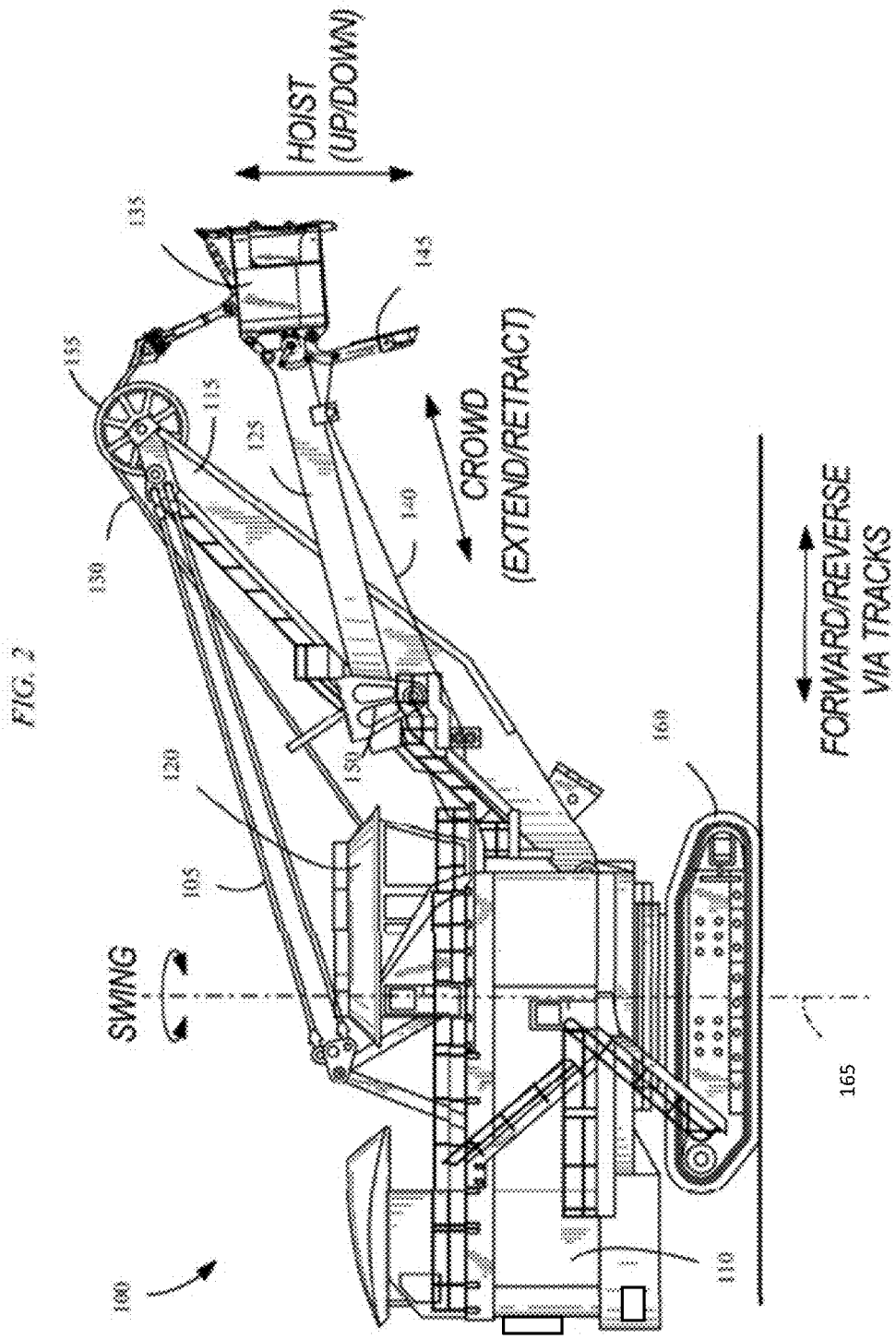
FIG. 2 illustrates a mining machine according to some embodiments.

FIG. 2 illustrates a rope shovel 100 that includes suspension cables 105 coupled between a base 110 and a boom 115 for supporting the boom 115, an operator cab 120, and a dipper handle 125. The rope shovel 100 also includes a wire rope or hoist cable 130 that may be wound and unwound within the base 110 to raise and lower an attachment or dipper 135, and a trip cable 140 connected between another winch (not shown) and the door 145. The rope shovel 100 also includes a saddle block 150 and a sheave 155. The rope shovel 100 uses four main types of movement: forward and reverse, hoist, crowd, and swing. Forward and reverse moves the entire rope shovel 100 forward and backward using the tracks 160. Hoist moves the attachment 135 up and down. Crowd extends and retracts the attachment 135. Swing pivots the rope shovel 100 around an axis 165. Overall movement of the rope shovel 100 utilizes one or a combination of forward and reverse, hoist, crowd, and swing. Other constructions of the rope shovel 100 do not include, for example, the operator cab 120 or one or more other components as described above.

Figure 3:
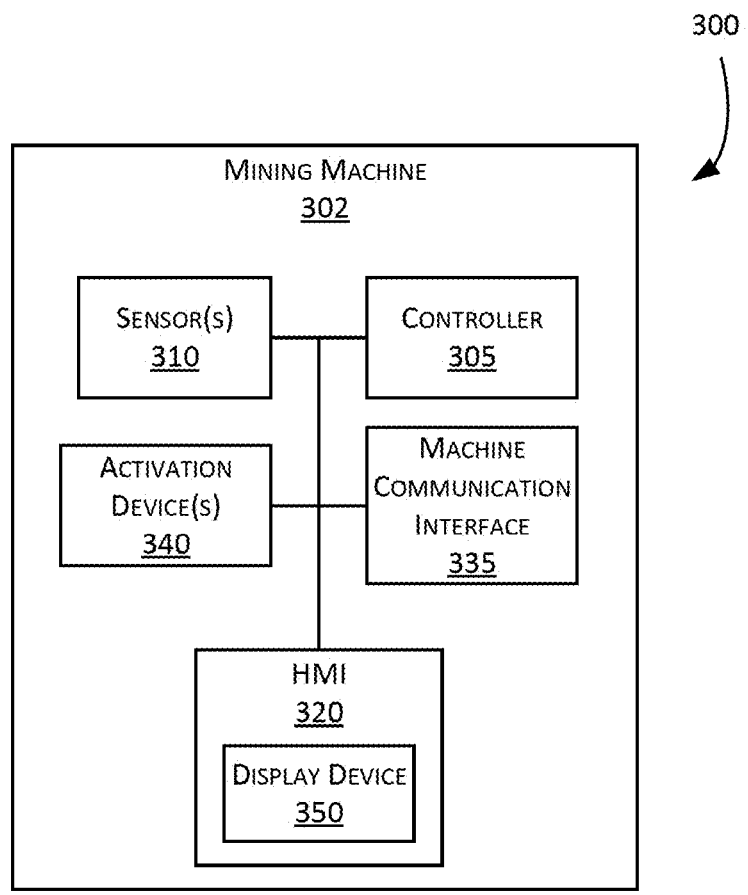
FIG. 3 schematically illustrates a system for operating a mining machine within a geofence according to some embodiments.

FIG. 3 schematically illustrates a system 300 of operating a mining machine 302 within a geofence according to some embodiments. Although the methods and systems described herein are described with reference to a mining machine 302 (a type of industrial machine) (for example, the blasthole drill 10 of FIG. 1, the rope shovel 100 of FIG. 2, or another mining machine), in some embodiments, the systems and methods described herein are for use with other (non-mining) types of mobile industrial machines, such as construction equipment (for example, a crane), a ship, or the like.

As illustrated in FIG. 3, the system 300 includes a controller 305, one or more sensors 310 (collectively referred to herein as "the sensors 310" and individually as "the sensor 310"), a human machine interface ("HMI") 320, and a machine communication interface 335 associated with the mining machine 302. In some embodiments, the system 300 includes fewer, additional, or different components than those illustrated in FIG. 3 in various configurations and may perform additional functionality than the functionality described herein. For example, in some embodiments, the system 300 includes multiple controllers 305, HMIs 320, machine communication interfaces 335, or a combination thereof. Also, in some embodiments, one or more of the components of the system 300 may be distributed among multiple devices, combined within a single device, or a combination thereof. The system 300 further includes one or more activation devices 340 (referred to herein collectively as "the activation devices 340" or individually as "the activation device 340"). Alternatively or in addition, in some embodiments, the system 300 includes other components associated with the mining machine 302, such as one or more actuators, motors, pumps, indicators, and the like, for example, to control the hoist, crowd, swing, and forward-reverse motions.

Figure 4:
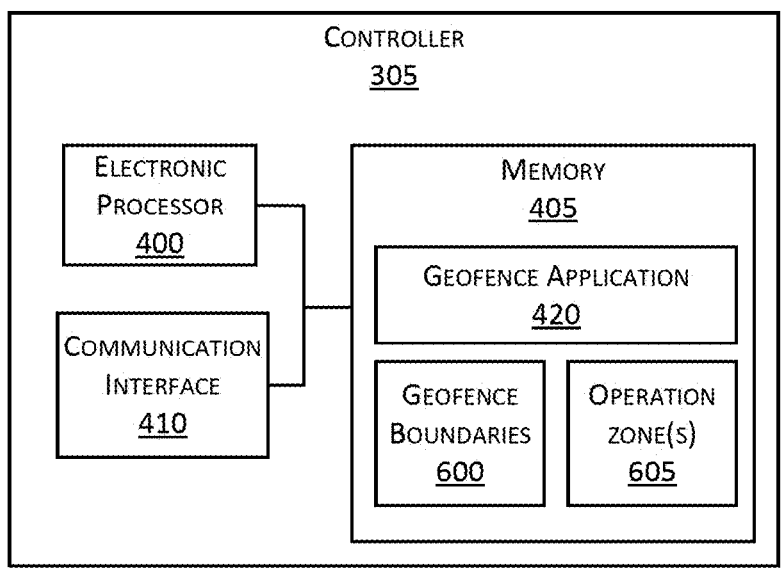
FIG. 4 schematically illustrates a controller of the system of FIG. 3 according to some embodiments.

In the example illustrated in FIG. 4, the controller 305 includes an electronic processor 400 (for example, a microprocessor, an application specific integrated circuit ("ASIC"), or another suitable electronic device), a memory 405 (for example, one or more non-transitory computer-readable storage mediums), and a communication interface 410. The electronic processor 400, the memory 405, and the communication interface 410 communicate over one or more data connections or buses, or a combination thereof. The controller 305 illustrated in FIG. 4 represents one example, and, in some embodiments, the controller 305 includes fewer, additional, or different components in different configurations than illustrated in FIG. 4. Also, in some embodiments, the controller 305 performs functionality in addition to the functionality described herein.

The communication interface 410 allows the controller 305 to communicate with devices external to the controller 305. For example, as illustrated in FIG. 3, the controller 305 may communicate with one or more of the sensors 310, the HMI 320, the machine communication interface 335, one or more of the activation devices 340, another component of the system 300 and/or mining machine 302, or a combination thereof through the communication interface 410. The communication interface 410 may include a port for receiving a wired connection to an external device (for example, a universal serial bus ("USB") cable and the like), a transceiver for establishing a wireless connection to an external device (for example, over one or more communication networks, such as the Internet, LAN, a WAN, and the like), or a combination thereof.

The electronic processor 400 is configured to access and execute computer-readable instructions ("software") stored in the memory 405. The software may include firmware, one or more applications, program data, filters, rules, one or more program modules, and other executable instructions. For example, the software may include instructions and associated data for performing a set of functions, including the methods described herein. As illustrated in FIG. 4, the memory 405 includes a geofence application 420, which is an example of such software. The geofence application 420 is a software application executable by the electronic processor 400 to perform position tracking of the mining machine 302 with respect to a geofence region or boundary using multiple operation zones positioned around the mining machine 302. For example, in some embodiments, the electronic processor 400, executing the geofence application 420, detects and tracks one or more perimeter points of operation zones positioned around the mining machine 302 (based on machine data collected by the sensors 310) relative to a geofence region or boundary and automatically controls one or more of the activation devices 340 to, for example, follow or allow a command, modify a command, prevent a command (for example, perform a stop command), or the like.

Figure 5A:
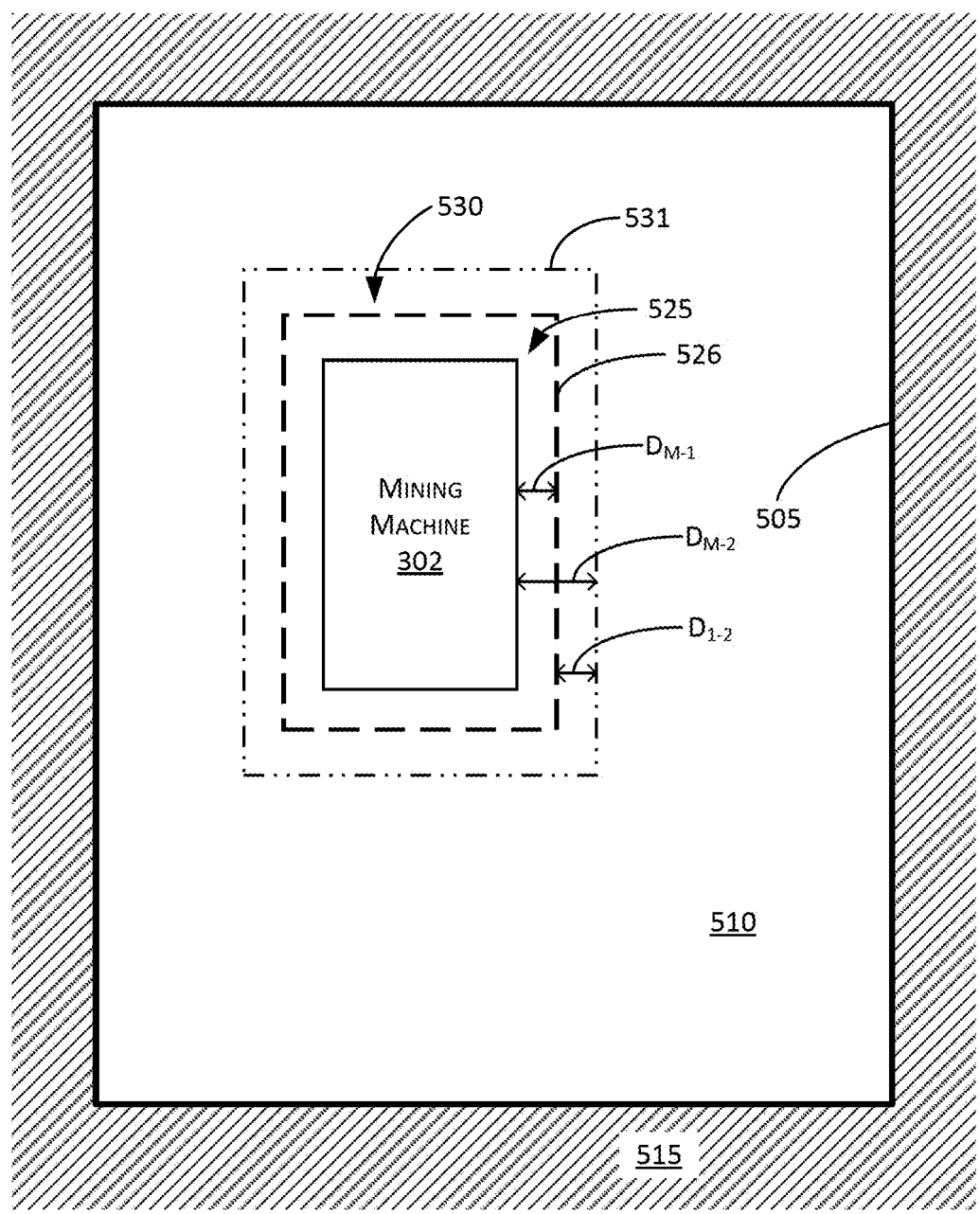
FIGS. 5A-5C illustrate a mining machine operating within proximity to a geofence boundary according to some embodiments.
Figure 5B:
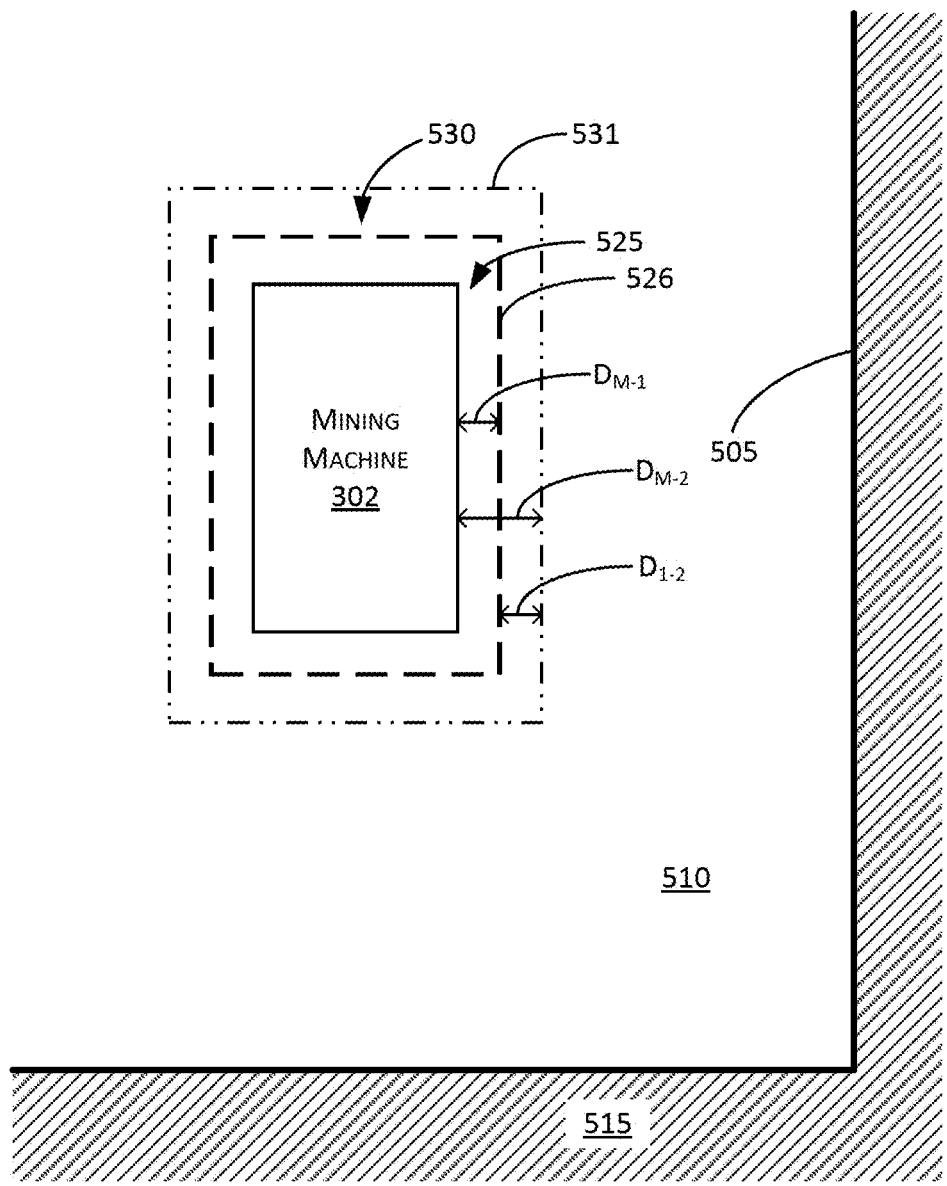
Figure 5C:
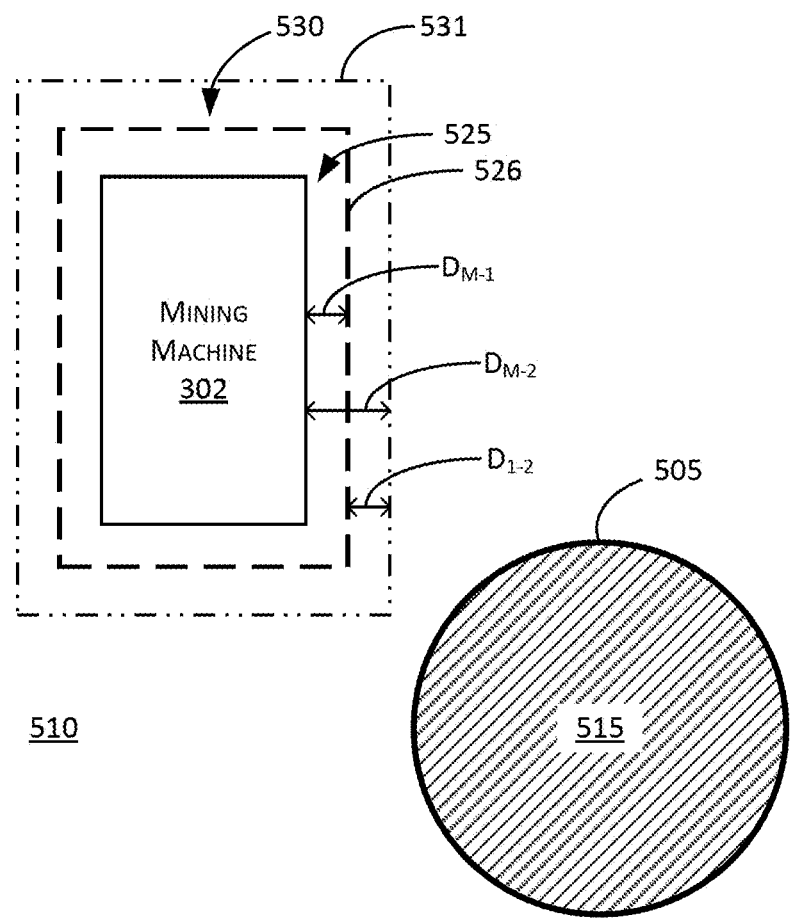

For example, FIGS. 5A-5C illustrate the mining machine 302 with respect to a geofence boundary 505 according to some embodiments. The geofence boundary 505 is a virtual boundary for a real-world geographic area that is generated using a predefined set of boundaries using, for example, GNSS technology. As seen in the example of FIGS. 5A-5C, the geofence boundary 505 defines a permitted area 510 and a restricted region 515. The permitted area 510 represents a region or area in which the mining machine 302 is permitted to operate in (for example, safely operate without a risk of being driven into a high wall, over a berm, or the like). In other words, the mining machine 302 may freely move around the permitted area 510 based on one or more commands, such as, for example, a propel command, a crowd command, a swing command, or another command for controlling operation of the mining machine 302 (i.e., autonomous or automated commands or commands from an on-board or remote operator that cause the mining machine to move over the ground surface). The restricted region 515 represents a region or area in which the mining machine 302 is not permitted to operate in. As one example, the restricted region 515 may represent an area in which operation of the mining machine 302 is unsafe.

As illustrated in FIG. 5A, the restricted region 515 completely surrounds the mining machine 302. However, in other embodiments, the restricted region 515 does not completely surround the mining machine 302. As one example, the restricted region 515 may be positioned on one or more sides of the mining machine 302. As illustrated in FIG. 5B, the restricted region 515 is positioned on two sides of the mining machine 302. Alternatively or in addition, in some embodiments, the restricted region 515 may define a region or area having another shape than illustrated in FIGS. 5A and 5B. As one example, the restricted region 515 may be circular in shape, as illustrated in FIG. 5C. Accordingly, a shape of the restricted region 515 may be regular, irregular, or the like. Additionally, although a single restricted region 515 (and geofence boundary 505) is illustrated in FIGS.

5A-5C, it should be understood that multiple restricted regions 515 (and geofence boundaries 505) may be implemented.

As illustrated in FIGS. 5A-5C, the mining machine 302 is surrounded by a first operation zone 525 (for example, a first virtual operation zone 525) and a second operation zone 530 (for example, a second virtual operation zone 525). As seen in FIGS. 5A-5C, the first operation zone 525 is positioned within the second operation zone 530. Accordingly, an area of the first operation zone 525 is smaller than an area of the second operation zone 530. Although the first operation zone 525 and the second operation zone 530 are illustrated in FIGS. 5A-5C as being rectangular in shape, in some embodiments, the first operation zone 525, the second operation zone 530, or a combination thereof may be a different shape than illustrated. Additionally, in some embodiments, the first operation zone 525, the second operation zone 530, or a combination thereof may replicate or mirror a shape depicting a natural boundary or perimeter of the mining machine 302. Accordingly, the first operation zone 525, the second operation zone 530, or a combination thereof may be irregular in shape.

The first operation zone 525 defines an area or region around the mining machine 302 that should not cross the geofence boundary 505 into the restricted zone 515. As seen in FIGS. 5A-5C, the first operation zone 525 is defined by a set of perimeter points forming a first boundary 526 of the first operation zone 525. Accordingly, the first operation zone 525 functions to ensure that a natural perimeter of the mining machine 302 does not cross the geofence boundary 505 into the restricted zone 515. Since the physical position of the natural perimeter of the mining machine 302 is not known with 100% certainty, a buffer zone is used. Accordingly, in some embodiments, the depth or size of the first operation zone 525 (with respect to the natural perimeter of the mining machine 302) is directly proportional to an uncertainty in a current position of the mining machine 302. Additionally, in some embodiments, the depth of the first operation zone 525 dynamically changes as the uncertainty changes. For example, when the uncertainty is calculated to be different, the depth of the first operation zone 525 changes. In some embodiments, uncertainty is determined by a position monitoring system of the mining machine 302, such as a global positioning system, a GNSS unit, or the like. For example, an error value or a degree of confidence may be determined using the position monitoring system of the mining machine 302. In some embodiments, the error value or degree of confidence may be used as the uncertainty. Alternatively or in addition, other sources of the uncertainty may be based on, for example, how much noise is introduced through vibrations that cause errors in acceleration calculations, which, in turn, may result in a potential error or degree of uncertainty in the estimation of the current position of the mining machine 302. Such values may be calculated using, for example, filtering algorithms or information collected by one or more sensors, such as GNSS units, inertial measurements units, lidar, or the like (for example, the sensors 310).

Figure 6:
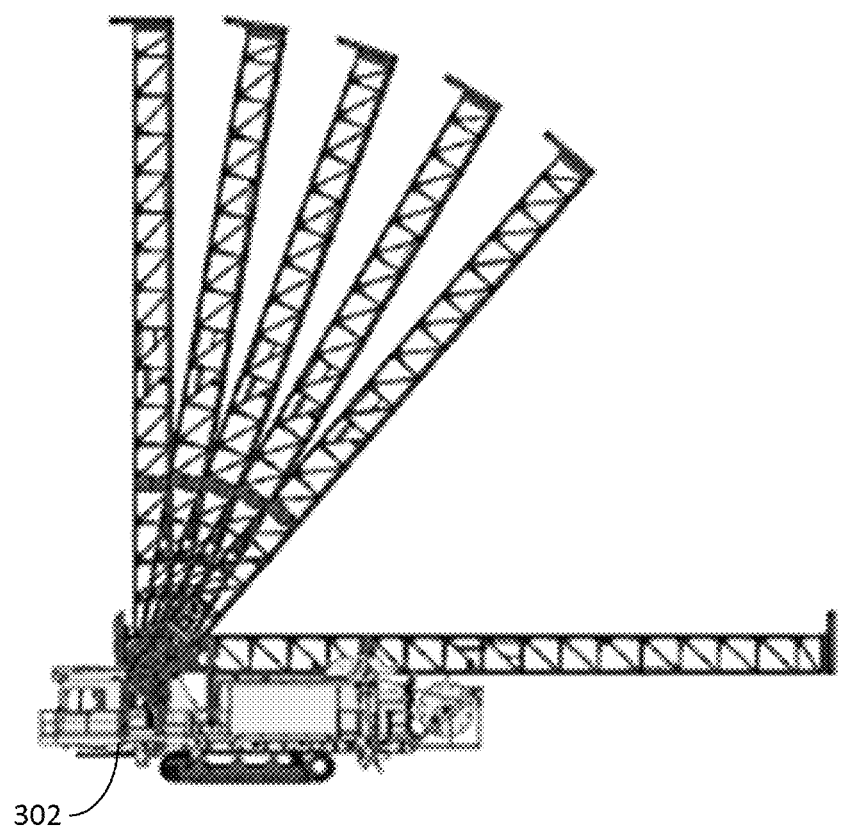
FIG. 6 illustrates angles for a mast of a mining machine according to some embodiments.

Alternatively or in addition, in some embodiments, the depth or size of the first operation zone 525 is dynamically changed based on one or more components of the mining machine, such as a position or angle of a component of the mining machine 302. As one example, with reference to FIG. 6, a mast of the mining machine 302 may change position or angle during operation of the mining machine 302. As the position or angle of the mast changes, the natural perimeter of the mining machine 302 may also change. Accordingly, in some embodiments, the first operation zone 525 may be based on (or dynamically changed based on) a position or angle of a component of the mining machine 302.

The second operation zone 530 defines an area and region around the mining machine 302 outside of the first operation zone 525. As seen in FIGS. 5A-5C, the second operation zone 530 is defined by a set of perimeter points forming a second boundary 531 of the second operation zone 530. The second operation zone 530 functions to cause the mining machine 302 to reduce propel references once the second operation zone 530 crosses the geofence boundary 505 into the restricted zone 515. Accordingly, as the second operation zone 530 enters the restricted zone 515, a speed of the mining machine 302 is controlled to slow the mining machine 302 down before the first operation zone 525 crosses the geofence boundary 505.

In some embodiments, a distance or depth between the first boundary 526 of the first operation zone 525 and the second boundary 531 of the second operation zone 530 is static (represented in FIGS. 5A-5B by the double arrow labeled "$D_{1-2}$"). The distance or depth between the first boundary 526 of the first operation zone 525 and the second boundary 531 of the second operation zone 530 (for example, "$D_{1-2}$") may be set by manufacturer, a machine administrator, or other machine personnel. However, a distance or depth between the natural perimeter of the mining machine 302 and the second boundary 513 of the second operation zone 530 (represented in FIGS. 5A-5C by the double arrow labeled "$D_{M-2}$") may vary (for example, based on the depth or size of the first operation zone 525). As one example, in response to the size or depth of the first operation zone 530 (represented in FIGS. 5A-5B by the double arrow labeled "$D_{M-1}$") changing (based on, for example, an uncertainty in the current position of the mining machine 302, a component of the mining machine 302, or a combination thereof), a distance or depth between the natural perimeter of the mining machine 302 and the second boundary 513 may change proportional to the change in size or depth of the first operation zone 530. However, the distance or depth between the first boundary 526 of the first operation zone 525 and the second boundary 531 of the second operation zone 530 may remain the same.

As seen in FIG. 4, in some embodiments, the memory 405 also stores a set of geofence boundaries 600 (for example, the geofence boundary 505 as a set of perimeter points defining the restricted region 515), a set of operation zones 605 associated with the mining machine 302 (for example, the first operation zone 525 and the second operation zone 530 as sets of perimeter points defining the first boundary 526 and the second boundary 531, respectively). Alternatively or in addition, the set of geofence boundaries 600, the set of operation zones 605, or a combination thereof may be stored at a remote device, such as a remote server or computing device. In such embodiments, the set of geofence boundaries 600, the set of operation zones 605, or a combination thereof may be transmitted to the mining machine 302 (for example, the controller 305) from the remote device.

Returning to FIG. 3, the sensors 310 detect and track a current location or position of the mining machine 302 (or a component thereof). The sensors 310 may be positioned on (or mounted to) the mining machine 302 at various positions or locations around the mining machine 302. Alternatively or in addition, the sensors 310 may be positioned external to the mining machine 302 at various positions or locations around the mining machine 302. The sensors 310 may include, for example, radar sensors, lidar sensors, infrared sensors (for example, a passive infrared ("PIR") sensor), an image sensor, and the like. In some embodiments, the sensors 310 may be part of a position monitoring system of the mining machine 302, such as a global positioning system, a GNSS, or the like.

As seen in FIG. 3, the system 300 also includes the HMI 320. The HMI 320 may include one or more input devices, one or more output devices, or a combination thereof. In some embodiments, the HMI 320 allows a user or operator to interact with (for example, provide input to and receive output from) the mining machine 302. As one example, an operator may interact with the mining machine 302 to control or monitor the mining machine 302 (via one or more control mechanisms of the HMI 320). The HMI 320 may include, for example, a keyboard, a cursor-control device (for example, a mouse), a touch screen, a joy stick, a scroll ball, a control mechanism (for example, one or more mechanical knobs, dials, switches, or buttons), a display device, a printer, a speaker, a microphone, or a combination thereof. As illustrated in FIG. 3, in some embodiments, the HMI 320 includes a display device 350. The display device 350 may be, for example, one or more of a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, or the like. The display device 350 may be located within the operator cab of the mining machine 302 (for example, the operator cab 25 of the drill 10 (FIG. 1) or the operator cab 120 of the rope shovel 100 (FIG. 2)). The HMI 320 (via, for example, the display device 350) may be configured to display conditions or data associated with the mining machine 302 in real-time or substantially real-time. For example, the HMI 320 is configured to display a graphical user interface to an operator of the mining machine 302 that indicates a location status of the mining machine 302 with respect to a geofence boundary or region. In some embodiments, the graphical user interface includes one or more graphical representations of the mining machine 302, the permitted area 510, the restricted region 515, the geofence boundary 505, the first operation zone 525, the first boundary 526, the second operation zone 530, the second boundary 531, or a combination thereof.

The actuation devices 340 are configured to receive control signals or commands (for example, from the controller 305, from an operator via one or more control mechanisms of the HMI 320, or the like) to control, for example, hoisting, crowding, propelling, and swinging operations of the mining machine 302. Accordingly, the activation devices 340 may include, for example, a motor, a hydraulic cylinder, a pump, and the like.

The machine communication interface 335 allows one or more components of the system 300 to communicate with devices external to the system 300 and/or the mining machine 302. For example, one or more components of the system 300, such as the controller 305, may communicate with one or more remote devices located or positioned external to the mining machine 302 through the machine communication interface 335. The machine communication interface 335 may include a port for receiving a wired connection to an external device (for example, a USB cable and the like), a transceiver for establishing a wireless connection to an external device (for example, over one or more communication networks, such as the Internet, LAN, a WAN, and the like), or a combination thereof. As one example, the controller 305 may communicate with a remote device or system (via the machine communication interface 335) as part of a remote control system or monitoring system of the mining machine 302, such that a remote operator may control or monitor the mining machine 302 from a remote location.

Figure 7:
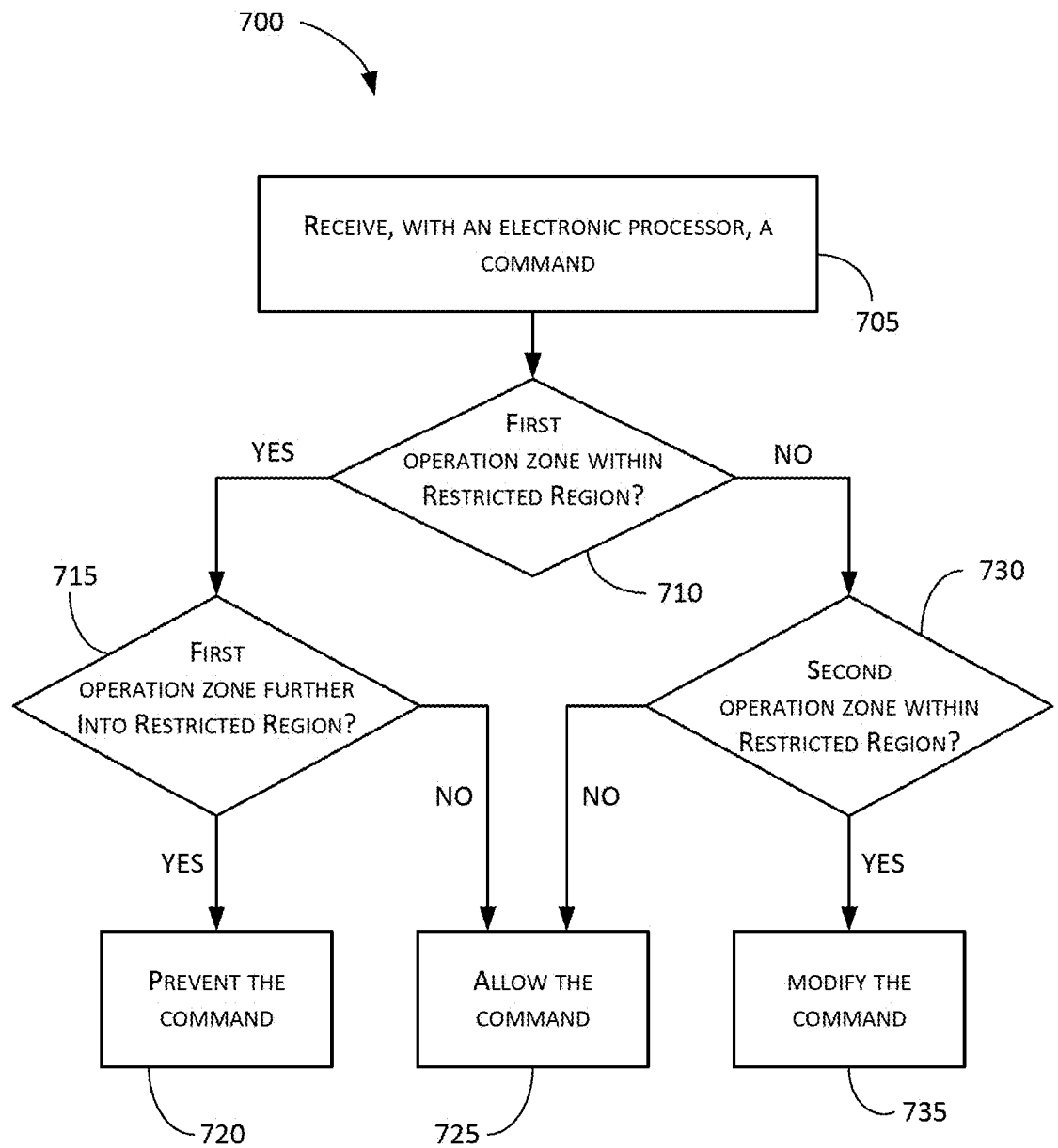
FIG. 7 is a flowchart illustrating a method for operating a mining machine within a geofence performed by the system of FIG. 3 according to some embodiments.

FIG. 7 is a flowchart illustrating a method 700 for operating the mining machine 302 with respect to a geofence performed by the system 300 according to some embodiments. The method 700 is described as being performed by the controller 305 and, in particular, the geofence application 420 as executed by the electronic processor 400. However, as noted above, the functionality described with respect to the method 700 may be performed by another device or devices, such as one or more remote devices located external to the mining machine 302.

As seen in FIG. 7, the method 700 includes receiving, with the electronic processor 400, a command for controlling the mining machine 302 (at block 705). A command may include, for example, a propel command, a crowd command, a swing command, or another command for controlling operation of the mining machine 302 (i.e., autonomous or automated commands or commands from an on-board or remote operator that cause the mining machine to move over the ground surface). As noted above, the HMI 320 allows a user or operator to interact with (for example, provide input to and receive output from) the mining machine 302. As one example, an operator may interact with the mining machine 302 to control or monitor the mining machine 302 (via one or more control mechanisms of the HMI 320). Accordingly, in some embodiments, the electronic processor 400 receives one or more commands from one or more control mechanisms of the HMI 320 (via the communication interface 410 of the controller 305). Alternatively or in addition, the command may be an autonomous or automatic command generated by an autonomous or automatic control system of the mining machine 302. Accordingly, in such embodiments, the electronic processor 400 may receive the command from the autonomous or automatic control system of the mining machine 302.

In response to receiving the command (at block 705), the electronic processor 400 determines whether a perimeter point of the first operation zone 525 is within the restricted region 515 (at block 710). As noted above, the first operation zone 525 is defined by a set of perimeter points forming a first boundary 526 of the first operation zone 525. Accordingly, at block 710, the electronic processor 400 determines whether a perimeter point of the first operation zone 525 (for example, the first boundary 526) is within the restricted region 515 (i.e., has crossed the geofence boundary 505).

As noted above, the first operation zone 525 defines an area or region around the mining machine 302 that should not cross the geofence boundary 505 into the restricted zone 515 (as seen in FIGS. 5A-5C). Additionally, as noted above, in some embodiments, the first operation zone 525 dynamically changes based on, for example, an uncertainty in a current position of the mining machine 302, a component of the mining machine 302, or a combination thereof. Accordingly, in some embodiments, the electronic processor 400 determines the first operation zone 525 (for example, a set of perimeter points defining the first boundary 526) prior to determining whether a perimeter point of the first operation zone 525 is within the restricted region 515 (i.e., has crossed the geofence boundary 505). In some embodiments, the electronic processor 400 determines the first operation zone 525 based on a component of the mining machine 302, such as a position or angle of a component. The electronic processor 400 may determine the position or angle of the component based on data or signals received from one or more of the sensors 310, control commands transmitted to one or more of the activation devices 340, or the like. Alternatively or in addition, in some embodiments, the electronic processor 400 determines the first operation zone 525 based on an uncertainty of a current position of the mining machine 302. The electronic processor 400 may determine the uncertainty of a current position of the mining machine 302 based on signals received from one or more of the sensors 310, control commands transmitted to one or more of the activation devices 340, or the like.

When a perimeter point of the first operation zone 525 is within the restricted region 515 (YES at block 710), the electronic processor 400 then determines whether performance of the command increases penetration of the first operation zone 525 into the restricted region 515 (at block 715). The electronic processor 400 may determine whether performance of the command increases or decreases penetration based on a current position (or orientation) of the mining machine 302 and the command. In some embodiments, the electronic processor 400 receives signals from one or more of the sensors 310. The signals received from one or more of the sensors 310 may include data describing a current position, current orientation, or the like of the mining machine 302. Accordingly, based on the signals received from one or more of the sensors 310, the electronic processor 400 may determine a current position, including a current orientation, of the mining machine 302. After determining a current position (and the current orientation), the electronic processor 400 may predict or determine whether the command will increase or decrease penetration of the first operation zone 525 into the restricted region 515. As one example, when the electronic processor 400 determines that the mining machine 302 is directly facing the restricted region 515 (based on the received signals) and the command is a forward propel command, the electronic processor 400 may determine that performance of the command will increase penetration of the first operation zone 525 into the restricted region 515. As another example, when the electronic processor 400 determines that the mining machine 302 is directly facing the restricted region 515 (based on the received signals) and the command is a reverse propel command, the electronic processor 400 may determine that performance of the command will decrease penetration of the first operation zone 525 into the restricted region 515.

When the electronic processor 400 determines that performance of the command increases penetration of the first operation zone 525 into the restricted region 515 (YES at block 715), the electronic processor 400 prevents the command (at block 720). Accordingly, when the command would move the first operation zone 525 further into the restricted region 515, the electronic processor 400 controls the mining machine 302 (via one or more of the activation devices 340) such that the mining machine 302 performs a stop command preventing the first operation zone 525 from moving further into the restricted zone 515.

However, when the electronic processor 400 determines that performance of the command does not increase (i.e., decreases) penetration of the first operation zone 525 into the restricted region 515 (NO at block 715), the electronic processor 400 allows the command (at block 725). Accordingly, when the command does not move the first operation zone 525 further into the restricted region 515, the electronic processor 400 controls the mining machine 302 (via one or more of the activation devices 340) such that the mining machine 302 performs the command moving the first operation zone 525 away from or outside of the restricted zone 515.

Returning to block 710 of FIG. 7, when a perimeter point of the first operation zone 525 is not within the restricted region 515 (NO at block 710), the electronic processor 400 then determines whether a perimeter point of the second operation zone 530 is within the restricted region 515 (at block 730). As noted above, the second operation zone 530 is defined by a set of perimeter points forming the second boundary 531 of the second operation zone 530. Accordingly, at block 710, the electronic processor 400 determines whether a perimeter point of the second operation zone 530 (for example, the second boundary 531) is within the restricted region 515 (i.e., has crossed the geofence boundary 505.

When the electronic processor 400 determines that a perimeter point of the second operation zone 530 is within the restricted region 515 (YES at block 730), the electronic processor 400 modifies the command (at block 735). In some embodiments, the electronic processor 400 modifies the command by limiting the command. As one example, the electronic processor 400 modifies the command by limited or reducing a speed of the mining machine 302. Accordingly, in some embodiments, when a perimeter point of the second operation zone 530 is within the restricted region 515, the electronic processor 400 modifies or limits the command by limiting or reducing a speed of the mining machine 302 such that the mining machine 302 gradually slows down (for example, before the first operation zone 525 crosses the geofence boundary 505).

When the electronic processor 400 determines that a perimeter point of the second operation zone 530 is not within the restricted region 515 (NO at block 730), the electronic processor 400 allows the command (at block 725). Accordingly, when a perimeter point of the second operation zone 530 is not within the restricted region 515, the electronic processor 400 controls the mining machine 302 (via one or more of the activation devices 340) such that the mining machine 302 performs the command.

In some embodiments, the electronic processor 400 generates and transmits a graphical user interface for display to an operator of the mining machine 302. The electronic processor 400 may transmit the graphical user interface to the display device 350 of the HMI 320 for display. Alternatively or in addition, the electronic processor 400 may transmit the graphical user interface via a display device located remotely from the mining machine 302 for display at a remote location. The graphical user interface may indicate or provide feedback with respect to a location status of the mining machine 302 with respect to the geofence boundary 505. In some embodiments, the graphical user interface may include one or more graphical representations depicting a location status of the mining machine 302 with respect to the geofence boundary 505. For example, the graphical user interface may include a graphical representation of the mining machine 302, the first operation zone 525 (for example, the first boundary 526) around the mining machine 302, the second operation zone 530 (for example, the second boundary 531) around the mining machine 302, the restricted region 515 (for example, the geofence boundary 505), and the like.

In some embodiments, the electronic processor 400 modifies a characteristic (for example, a color) of the graphical representations based on the location status. As one example, when the first operation zone 525 is not within the restricted region 515, the electronic processor 400 may generate the graphical representation of the mining machine 302 in a first color (for example, green). When the first operation zone 525 is within the restricted region 515, the electronic processor 400 may generate a graphical representation of the mining machine 302 in a second color (for example, yellow). When the second operation zone 530 is within the restricted region 515, the electronic processor 400 may generate a graphical representation of the mining machine 302 in a third color (for example, red). Alternatively or in addition, in some embodiments, the electronic processor 400 may generate and transmit (for example, to the HMI 320) another type of warning or alert, such as a tactile warning, an audible warning, or the like, indicating the location status of the mining machine 302 with respect to the restricted region 515 (for example, the geofence boundary 505).

Accordingly, embodiments described herein provide systems and methods for operating a mining machine with respect to a geofence.

What is claimed is:

1. A system for operating a mobile industrial machine with respect to a geofence, the system comprising:
    an electronic processor configured to:
        receive a command for controlling the mobile industrial machine,
        determine a first operation zone positioned around the mobile industrial machine, wherein the first operation zone is a dynamic area around the mobile industrial machine,
        determine whether a perimeter point of a first operation zone positioned around the mobile industrial machine is within a restricted region, and
        in response to determining that the perimeter point of the first operation zone is within the restricted region:
            determine whether performance of the command increases penetration of the first operation zone into the restricted region, and
            control the mobile industrial machine to perform the command or a stop command based on whether the performance of the command increases penetration of the first operation zone into the restricted region.

2. The system of claim 1, wherein the electronic processor is configured to dynamically determine the first operation zone based on an uncertainty in a current position of the mobile industrial machine.

3. The system of claim 2, wherein the first operation zone is proportional to the uncertainty in the current position of the mobile industrial machine.

4. The system of claim 1, wherein the electronic processor is configured to dynamically determine the first operation zone based on a position associated with a component of the mobile industrial machine.

5. The system of claim 4, wherein the component of the mobile industrial machine is a mast.

6. The system of claim 1, wherein the electronic processor is further configured to:
    in response to determining that the perimeter point of the first virtual operation zone is not within the restricted region:
        determine whether a perimeter point of a second virtual operation zone is within the restricted region, wherein the second virtual operation zone is positioned around the mobile industrial machine and nested within the first virtual operation zone, and
        control the mobile industrial machine to perform the command or a modified command based on whether the perimeter point of the second virtual operation zone is within the restricted region.

7. The system of claim 6, wherein the electronic processor is configured to:
    control the mobile industrial machine to perform the command when the perimeter point of the second virtual operation zone is not within the restricted region, and
    control the mobile industrial machine to perform the modified command when the perimeter point of the second virtual operation zone is within the restricted region.

8. The system of claim 6, wherein the electronic processor is configured to:
    determine the modified command based on an amount of penetration of the second virtual operation zone into the restricted region.

9. A system for operating a mobile industrial machine with respect to a geofence, the system comprising:
    an electronic processor configured to:
        determine a first virtual operation zone positioned around the mobile industrial machine, wherein the first virtual operation zone is a dynamic area around the mobile industrial machine,
        modify a parameter of the first virtual operation zone,
        dynamically modify the first virtual operation zone based on a change in a configuration of a component of the mobile industrial machine, the change in the configuration including a change in a position or an angle of the component relative to a base of the mobile industrial machine, and
        control the mobile industrial machine based on the first virtual operation zone.

10. The system of claim 9, wherein the electronic processor is configured to dynamically modify the first virtual operation zone based on an uncertainty in a current position of the mobile industrial machine.

11. The system of claim 10, wherein the first virtual operation zone is proportional to the uncertainty in the current position of the mobile industrial machine.

12. The system of claim 9, wherein the component of the mobile industrial machine is a mast.

13. The system of claim 9, wherein the electronic processor is further configured to receive a command for controlling the mobile industrial machine,
    determine whether a perimeter point of the first virtual operation zone is within a restricted region, and
    control the mobile industrial machine based on whether the perimeter point of the first virtual operation zone is within the restricted region.

14. The system of claim 13, wherein the electronic processor is further configured to
    in response to determining that the perimeter point of the first virtual operation zone is within the restricted region,
        determine whether performance of the command increases penetration of the first virtual operation zone into the restricted region, and
        control the mobile industrial machine to perform the command or a stop command based on whether the performance of the command increases penetration of the first virtual operation zone into the restricted region.

15. The system of claim 14, wherein the electronic processor is configured to
    control the mobile industrial machine to perform the command when the performance of the command decreases penetration of the first virtual operation zone into the restricted region, and control the mobile industrial machine to perform the stop command when the performance of the command increases penetration of the first virtual operation zone into the restricted region.

16. The system of claim 13, wherein the electronic processor is further configured to in response to determining that the perimeter point of the first virtual operation zone is not within the restricted region, determine whether a perimeter point of a second virtual operation zone is within the restricted region, wherein the second virtual operation zone is positioned around the mobile industrial machine and nested within the first virtual operation zone, and control the mobile industrial machine to perform the command or a modified command based on whether the perimeter point of the second virtual operation zone is within the restricted region.

17. The system of claim 16, wherein the modified command is a reduced speed command.

18. The system of claim 16, wherein the electronic processor is configured to control the mobile industrial machine to perform the command when the perimeter point of the second virtual operation zone is not within the restricted region, and control the mobile industrial machine to perform the modified command when the perimeter point of the second virtual operation zone is within the restricted region.

19. The system of claim 16, wherein the electronic processor is configured to determine the modified command based on an amount of penetration of the second virtual operation zone into the restricted region.

20. The system of claim 9, wherein the electronic processor is further configured to generate and transmit a graphical user interface for display to an operator of the mobile industrial machine, wherein the graphical user interface indicates a location status of the mobile industrial machine with respect to a restricted region.

* * * * *